Sept. 25, 1951 J. GODEFROY 2,568,916
THERMOSTATIC DEVICE FOR CONTROLLING HEATING APPARATUS
Filed Dec. 26, 1947 2 Sheets-Sheet 1
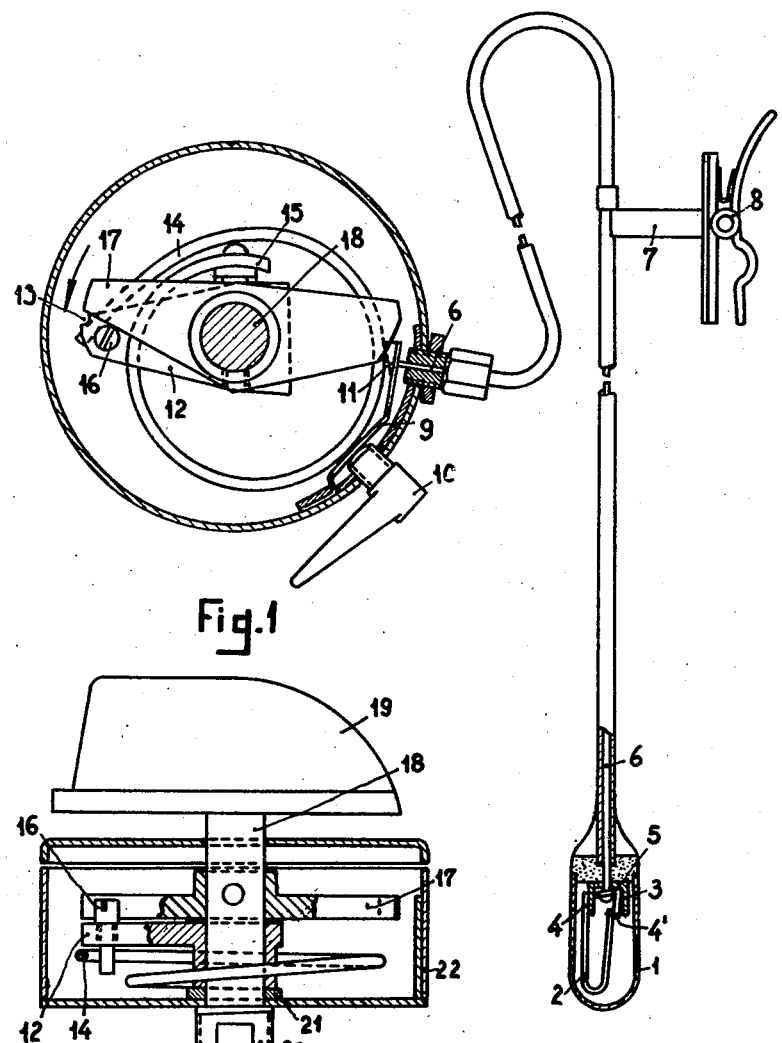
Inventor
Johan Godefroy
By Robert E. Burns
Attorney Sept. 25, 1951  J. GODEFROY  2,568,916
THERMOSTATIC DEVICE FOR CONTROLLING HEATING APPARATUS
Filed Dec. 26, 1947  2 Sheets-Sheet 2

Inventor
Johan Godefroy
By Robert E Burns
Attorney

Patented Sept. 25, 1951

2,568,916

UNITED STATES PATENT OFFICE 2,568,916

THERMOSTATIC DEVICE FOR CONTROLLING HEATING APPARATUS

Johan Godefroy, Overveen, Netherlands

Application December 26, 1947, Serial No. 793,812
In the Netherlands April 3, 1946

Section 1, Public Law 690, August 8, 1946
Patent expires April 3, 1966

7 Claims. (Cl. 74—2)

1

The invention relates to a device for automatically shutting off a heating element at a predetermined temperature e. g. a gasburner at the moment the contents of a cooking vessel heated by the burner are heated to or just below the cooking temperature, especially for preventing the boiling over of milk.

The object of the invention is to provide a device of the kind mentioned above which is reliable and of a practical and simple construction. Another object of the invention is to provide a bimetallic control with means for regulating the temperature at which the device will be automatically operable between sufficiently wide limits with great accuracy. A further object is the provision of means for not only completely shutting off the heating element, but also for positioning the heating element in intermediate positions for reduced heating.

These and other ends in view will readily appear as the nature of the invention is better understood, the same consisting in the improved construction, novel arrangement and combination of parts which will be hereinafter fully described and particularly pointed out in the claims.

In the accompanying drawing have been illustrated some embodiments of the invention, it being, however understood that no limitation is necessarily made to the precise structural details therein exhibited, but that changes, alterations and modifications within the scope of the claims may be resorted to when desired.

In the drawing,

Fig. 1 is partly a horizontal section, partly a horizontal view of a control box for turning off a gasburner, adapted to be placed on the plug of a gascock, with a bimetallic control device connected to said control box.

Fig. 2 is partly a vertical section, partly a vertical view of the control box of Fig. 1.

Figure 5:
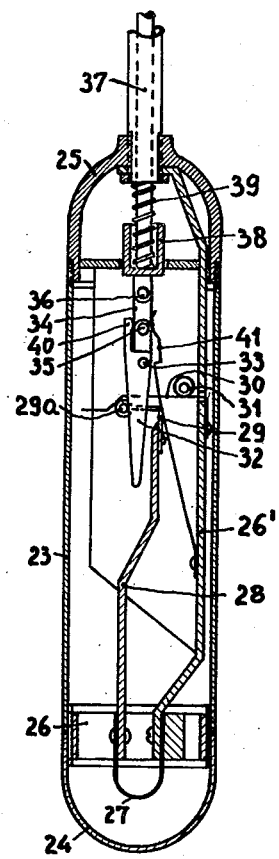
Fig. 5 shows a longitudinal section of a preferred embodiment of a bimetallic control device for use with the device according to the Figs. 3 and 4.
Figure 6:
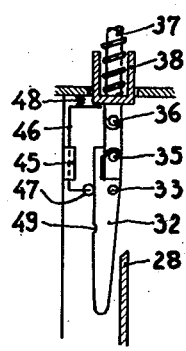
Figure 7:
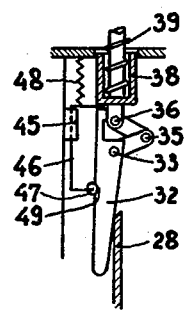
Figure 8:
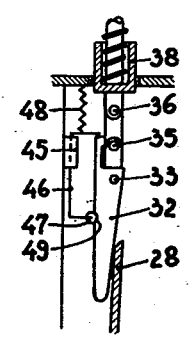

Figs. 6, 7 and 8 schematically show the arrangement for returning the pushing arm of the bimetallic control device according to Figure 5 to the initial position.

Figure 9:
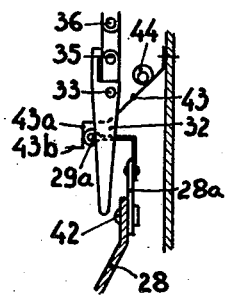

Fig. 9 shows a modified device of the arrangement for adjusting the moment of shut-off applied to the device according to Fig. 5.

In the first embodiment according to the Figures 1 and 2 the casing for a U-formed bimetallic strip 2 is indicated by 1, one leg of said strip being connected to an inversed U-profile 3 at 4. The free end of the bimetallic strap is connected to one leg of a bell crank 5, the other leg being connected to the wire of a Bowden-cable. The cable carries an arm 7 with a clip 8, adapted to be clipped on e. g. the edge of a milk cooker, so that the casing 1 may be immersed in the milk.

The wire 6 enters the control box near the locking device 11, which is connected to a leaf spring 9, fixed to the wall of the box. The locking device 11 can be adjusted by means of an adjusting screw 10.

A turning arm 12 is freely rotatable around the shaft 18 and is connected to a spiral spring 14 which at 15 is connected to the wall of the box. Above the arm 12 a disc 17 is keyed to the shaft. This disc 17 coacts with a pin 16 in the arm 12 when the operating knob 19 is rotated in the direction of the arrow in Fig. 1. The arm 12 will now be rotated against the action of the spring 14 and after a rotation of about 180° will be held by the latching device 11 snapping into the notch 13.

The knob 19 may now be turned back over 90°, in which case the gascock is opened completely, but of course the knob can be turned into intermediate positions for opening the cock into intermediate positions. When at a certain moment the fluid is heated to a predetermined temperature, e. g. when the milk is on the point of boiling over, the wire 6 will be pulled back by means of the bimetallic strip 2 and will release the latching device 11, so that the turning arm 12 is set free.

By means of the spring 14 the switching off arm 12 is now rotated back into the original position shown in Figure 1, the pin 16 coacts with the disc 17, rotating the shaft 18, so that the gascock is closed and the boiling over of the milk is prevented.

By adjusting the screw 10 the moment at which the latching device 11 snaps out of the notch 13 can be easily controlled. Thus the turning arm 12 may be set free at different temperatures.

In the embodiment of the bimetallic control described hereinbefore the displacements of the free end of the bimetallic strip are rather small. However for actuating the control box and especially for adjusting the moment of shut-off it is desirable to have a larger displacement. Also it must be considered as a drawback, that the energy needed for the release of the latching device must be supplied by the bimetallic strip.

If a rather small bimetallic strip and small dimensions for the control device combined with a very accurate adjustment of the temperature and a large range of adjustment are desired, the embodiments of the bimetallic control and of the control box which will be now described are to be preferred. In these embodiments the displacement of the bimetallic strip is used for the folding of a knee-joint, one of the links of this joint being hinged to a fixed shaft, the other link being connected to the Bowden-cable.

This arrangement of the bimetallic control is shown in Fig. 5. The casing 23 is closed by screwcaps 24 and 25 and has a support 26 for connecting the U-formed bimetallic strip 27. This support 26 also carries a frame 26' for supporting several parts of the control device switch. The top part of the free leg of the bimetallic strip 27 is connected to a pushing arm 28 provided with a leaf spring 29 with a roll 29a, which roll coacts with a second leaf spring 30, which is adjustable by an eccentric 31. The pushing arm 28 coacts with a lever 32 which is rotatable around a fixed shaft 33. The first link of the knee-joint is hinged to this shaft, the second link 34 being hinged to the first link at 35 and to the Bowden cable 37 at 36. On the Bowden cable is fixed a bushing 38, a compression spring being applied between this bushing and the cap 25, this spring tending to fold the knee joint 33, 35, 36.

The lever 32 has a head 40 which is pressed against the joint 35. At the other side of this joint 35 a week spring 41 presses on this joint to prevent unintentional folding of the knee joint. If now the bimetal 27 expands as a result of the heating of the fluid, the arm 28 will try to move the roll 29a to the left in Figure 5. The spring 30 will resist this displacement, until the roll 29a has reached the horizontal part of the spring 30. The arm 28 now strikes against the lever 32. The head 40 of this lever strikes against the joint 35 of the knee joint, so that this joint is folded by means of the spring 39 and the Bowden cable 37 is pulled downwards in Fig. 5. This displacement of the Bowden cable is used for actuating the control box of a gascock according to the Figures 3 and 4, as will be described hereafter. The construction of the bimetallic control of Figure 5 can be improved in some ways. It is important to be able to adjust the exact moment of shut-off and also the shutting off movement should not take place gradually, but rather suddenly, the arm 28 striking the lever 32 with a sudden blow.

Figure 9 shows a preferred arrangement for obtaining these aims.

In this construction the arm 28 is provided with an extension 28a, which can be shoved in and secured on the part 28 by a screw bolt 42. Thus the height of the roll 29a with regard to the spring 43 can be adjusted.

Furthermore to enable the spring 43 turning aside easily and smoothly and suddenly releasing the roll 29a, the spring 43 is applied at an angle of 45–60° with the axis of the casing 23, while the roll 29a rests against a part of this spring lying in the direction of this axis, another portion of the spring being bent into a horizontal direction.

In this construction it is also possible to adjust the pressure of the spring 43 by an eccentric 44 for the fine adjustment, while the coarse adjustment is achieved by the adjustment of the height of the roll 29 by means of the screw bolt 42.

In this way it is possible to vary the temperature at which the pushing arm 28 will strike the lever in a range of some tens of degrees, e. g. between 80° and 100° C. The eccentric 44 makes it possible to adjust to an accuracy of some degrees. It is obvious that the devices for adjusting the screw bolt 42 and the eccentric 44 may be combined with indicators outside the casing 23 for reading off the adjustment made.

The Figures 6, 7 and 8 schematically show an arrangement for returning the pushing arm 28 in Fig. 5 after the knee joint 33, 35, 36 has been folded. In the Figure 6 the parts are shown in the same position as indicated in the Figure 5. Between the wall of the casing 23 and a guiding strap 45 a slide 46 is slidable in the longitudinal direction of the casing, a flange of said slide lying under the bushing 38 and being connected to the casing by a tension spring 48. The underside of the slide 46 carries a roll 47 resting on the side of the lever 32, opposite to the fixed shaft 33 in Fig. 6.

If now the pushing arm 28 contacts the lever 32, the knee joint 33, 35, 36 will be folded by means of the spring 39 as already described (Fig. 7). The bushing 38 is now lowered and the slide 146 is moved downwards against the action of the spring 48, the roll 47 rotating the lever 32 in the opposite direction directly after the folding of the knee joint has happened.

This lever 32 will now be more or less clamped between the arm 28 and the roll 47, which roll in its end position snaps into a cavity of the lever 32. If the knee joint is now stretched by pulling at the Bowden cable when the turning device in the control box is rotated, as will appear later in the description of the Figures 3 and 4, the parts will be positioned as drawn in the Figure 8. The arm 28 of the not yet cooled bimetallic strip will try to rotate the lever 32 in the direction for folding the knee joint, but this is now prevented by the roll 47. Thus it is possible to use the burner for heating the new contents of a vessel directly after the shutting off of the burner, the burner not being directly turned off again by the insufficiently cooled bimetal. When after some time the bimetal is sufficiently cooled and consequently the arm 28 has been moved to the right in the Figure 8, there will be less pressure between the roll 47 and the lever 32, so that the spring 48 can now pull back the slide 46, by which the device is returned into the position shown in the Figure 6 again.

It is now possible to open the gascock for heating another pan and the bimetallic control element can be placed in this pan and after some time it will automatically shut off the gascock at a predetermined temperature again. Thus the device is made fool-proof.

Figure 3:
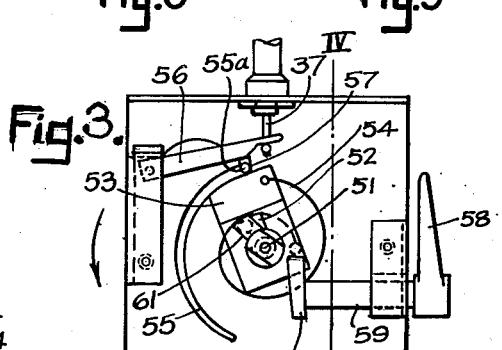
Fig. 3 shows partly a horizontal section, partly a horizontal view of a second embodiment of a control box for shutting off a gasburner adapted to be placed on the plug of a gascock.

Fig. 3 shows partly a vertical section, partly a vertical view of a control box especially adapted to be used with the bimetallic element according to the Figures 5–9, Fig. 4 showing a section along the line IV—IV in Fig. 3. The operating knob is indicated by 50, the shaft of the gascock control box by 51. This shaft has a pin 52 which when the shaft is turned in the direction of the arrow in Fig. 3 contacts with a pin in a cock turning disc 53 which is freely rotatable around the shaft against the action of a spiral spring 54. The cock turning disc is provided with an upturned flange 55 which is eccentrically placed with regard to the shaft 51.

The end of the Bowden-cable is connected to a resilient strip 56 which carries a roll 57. The roll 57 coacts with the eccentric flange. Fig. 3 shows the position when the Bowden cable has been tightened and the knee joint 33, 35, 36 (Fig. 5) has been stretched. This tightening of the cable has been attained by turning the knob 50 through an angle of 180° in the direction of the arrow in Fig. 3, the inner side of the eccentric flange 55 pulling the roll 57 in the direction of the shaft 51.

At the end of the tightening of the cable the roll snaps into a small recess 55a in the flange 55, this position being shown in Fig. 3 so that the shut-off disc is locked. The knob 50 now can be turned back freely placing the gascock in the desired position.

If the locking device 55, 57 is unlocked by pulling at the cable 37 when the bimetallic element is heated and the knee joint is folded, the turning shaft 51 will be rotated in a direction, contrary to the arrow in Fig. 3 and the gascock will be closed.

It is desirable that the angle through which the gascock is turned off may be regulated, so that the cock can not only be completely closed but may be stopped at intermediate positions.

Fig. 3 schematically shows an arrangement for this purpose.

On a shaft 59 which is provided with an adjusting lever 58, an eccentric 60 is placed, a cam 61 on the shaft 51 being adapted to coact with this eccentric. An indicating scale for the lever 58 may be applied to the wall of the control box. On the lower part of the shaft 51 a coupling 62 is fixed on this shaft by a screw 63.

The coupling is provided with three screws 64 which make it possible to couple the shaft 51 to shafts of different dimensions.

Figure 4:
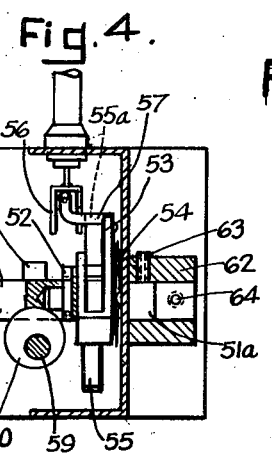
Fig. 4 is a vertical section along the line IV—IV in Fig. 3.

Fig. 4 further shows, that the shaft 51 is divided into two parts 51a and 51b, the part 51b on which the knob 50 is fixed being slidable along such a distance, that the coupling between the turning disc 53, 55 and the shaft 51b can be disengaged. When the part 51b of the shaft is moved upwards, the pin 52 fixed in the opened end of this part is moved in an eye of the part 51a of the shaft, thus this pin being moved out of the path of the coacting pin.

So the operating knob has two positions and in the upper position the gascock can be adjusted independently of the bimetallic element, so that the arrangement may also be used as a normal gascock, without using the automatic shut off device.

This is important e. g. in the case that the bimetallic control is out of order. It will be appreciated that the bimetallic control device as described hereinbefore can be formed as a small smoothly finished, fluid tight metallic cylinder that can be easily cleaned.

I claim:

1. A thermostatic device for controlling heating apparatus, comprising a hollow thermo-conductive bulb, an element in said bulb movable in response to application of heat thereto, movement translating means in operative connection with said element, means for rotatably controlling the operative position of the heating apparatus, motor means for returning said controlling means to a normal inoperative position having a source of energy activated upon turning of said controlling means, said motor means being in part rotatable with said controlling means, means for holding said source in a potentially operative state for a given position of said motor means, means for associating said holding means and said movement translating means, whereby upon application of a given amount of heat to said element said holding means releases said motor means and the controlling means is turned to close the heating apparatus, and means for adjusting said holding means, whereby the temperature at which a release of said motor means takes place may be controlled.

2. A thermostatic device for controlling heating apparatus, comprising a hollow thermo-conductive bulb, an element in said bulb movable in response to application of heat thereto, movement translating means in operative connection with said element, means for rotatably controlling the operative position of the heating apparatus, said controlling means comprising a manually rotatable shaft having a coupling for connection to a gas burner cock, motor means for returning said controlling means to a normal inoperative position having a source of energy activated upon turning of said controlling means, means for holding said source in a potentially operative state for a given position of said motor means, and means for associating said holding means and said movement translating means, whereby upon application of a given amount of heat to said element said holding means releases said motor means and the controlling means is turned to close the heating apparatus, said motor means comprising an arm freely rotatable on said shaft, and said source comprising a helical spring secured between said arm and a support, and a pin on said arm, said controlling means further including a member on said shaft, said pin being disposed to engage said member.

3. A thermostatic device for controlling heating apparatus, comprising a hollow thermo-conductive bulb, an element in said bulb movable in response to application of heat thereto, movement translating means in operative connection with said element, said movement translating means including a Bowden cable, a movement multiplier including a collapsible knee joint mechanism at one end of said cable normally in an extended condition and means tending to collapse said joint upon movement of said heat responsive element including a spring on the end of said cable, whereby a small movement of said element will effect a comparatively large movement of said cable, means for rotatably controlling the operative position of the heating apparatus, motor means for returning said controlling means to a normal inoperative position having a source of energy activated upon turning of said controlling means, said motor means being in part rotatable with said controlling means, means for holding said source in a potentially operative state for a given position of said motor means, and means for associating said holding means and said movement translating means, whereby upon application of a given amount of heat to said element said holding means releases said motor means and the controlling means is turned to close the heating apparatus.

4. A device according to claim 3, further including means for adjusting said means for collapsing said joint.

5. A device according to claim 3, further including means associated with said rotatable controlling means for tightening said cable upon rotation thereof.

6. A device according to claim 5, further including means for precisely adjusting the rotary position of said rotatable controlling means.

7. A thermostat device for controlling heating apparatus, comprising a hollow thermo-conductive bulb, an element in said bulb movable in response to application of heat thereto, movement translating means in operative connection with said element, means for rotatably controlling the operative position of the heating apparatus, motor means for returning said controlling means to a normal inoperative position having a source of energy activated upon turning of said controlling means, said motor means being in part rotatable with said controlling means, means for holding said source in a potentially operative state for a given position of said motor means, means for associating said holding means and said movement translating means, whereby upon application of a given amount of heat to said element said holding means releases said motor means and the controlling means is turned to close the heating apparatus, and means for disconnecting said rotatable controlling means from said motor means, whereby independent actuation thereof may be had.

JOHAN GODEFROY.

REFERENCES CITED

The following references are of record in the file of this patent:

UNITED STATES PATENTS

| Number | Name | Date |
|---|---|---|
| 1,134,892 | Myszkier | Apr. 6, 1915 |
| 1,208,617 | Montague | Dec. 12, 1916 |
| 1,499,834 | Lux | July 1, 1924 |
| 1,725,006 | Kelp | Aug. 20, 1929 |
| 1,785,787 | Rayfield | Dec. 23, 1930 |
| 1,857,504 | Hartfield et al. | May 10, 1932 |
| 2,103,513 | Campbell | Dec. 28, 1937 |
| 2,174,028 | Blakesley | Sept. 26, 1939 |
| 2,179,141 | Thompson | Nov. 7, 1939 |

FOREIGN PATENTS

| Number | Country | Date |
|---|---|---|
| 19,207 | Great Britain | Aug. 28, 1906 |
| 169,309 | Switzerland | May 31, 1934 |